Nov. 30, 1965    M. H. MATHISEN    3,220,749
TRAILER HITCH
Filed Nov. 30, 1962    3 Sheets-Sheet 1
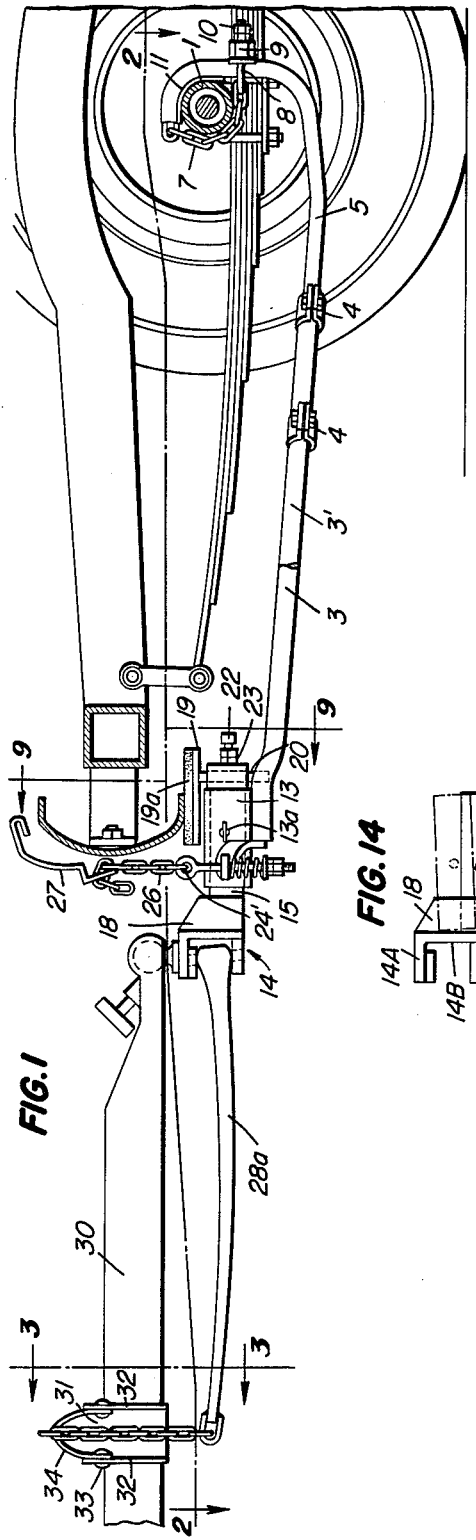
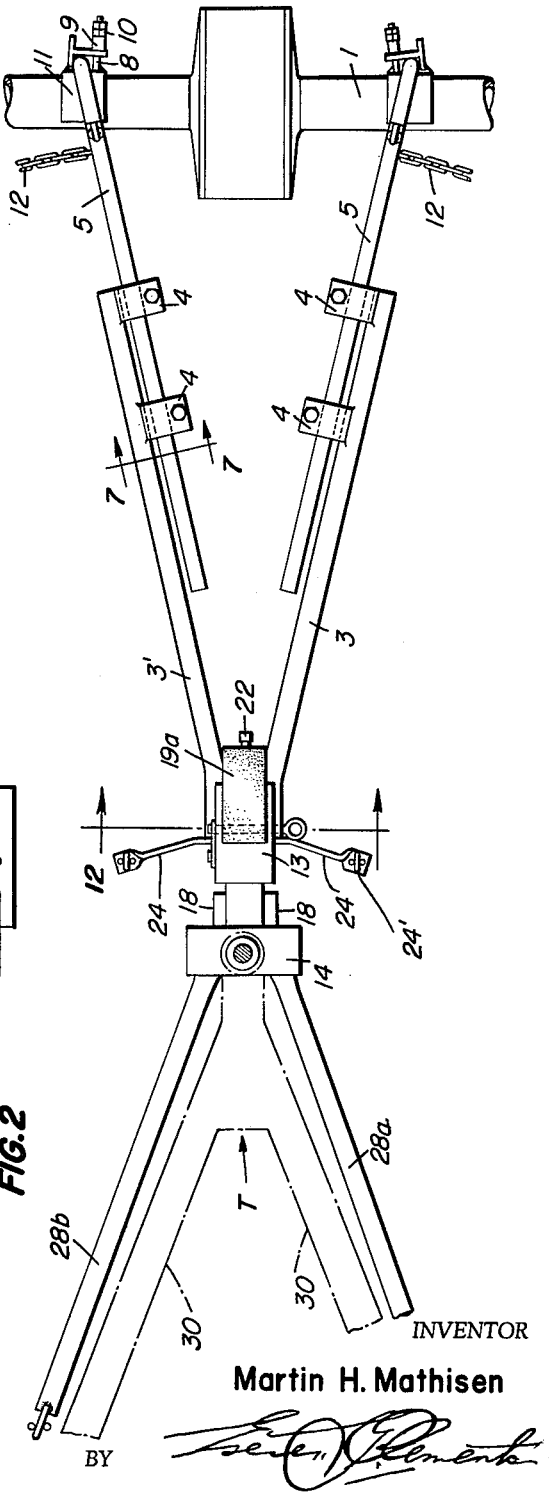
INVENTOR
Martin H. Mathisen
BY
ATTORNEY

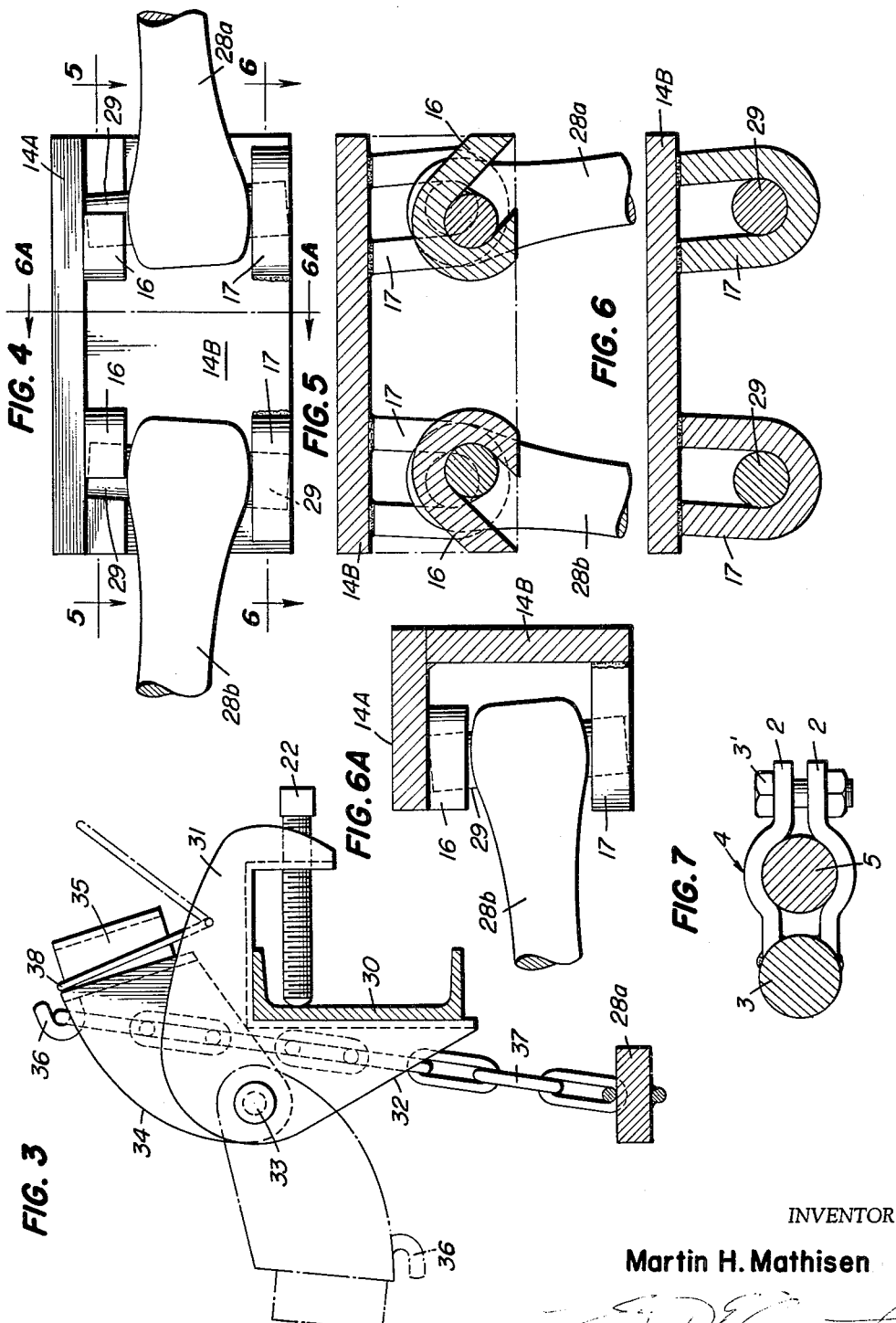

Nov. 30, 1965    M. H. MATHISEN    3,220,749
TRAILER HITCH
Filed Nov. 30, 1962    3 Sheets-Sheet 3
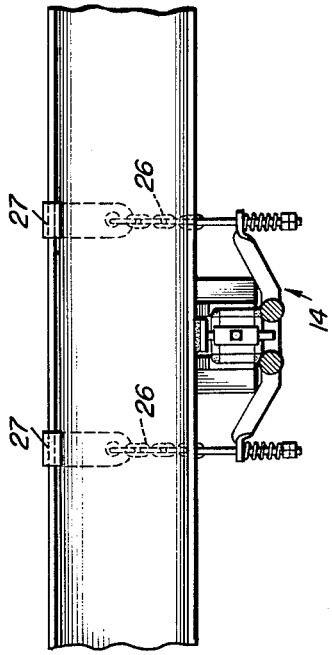
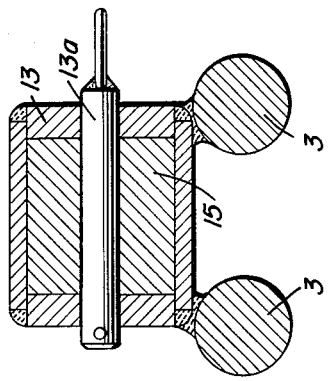
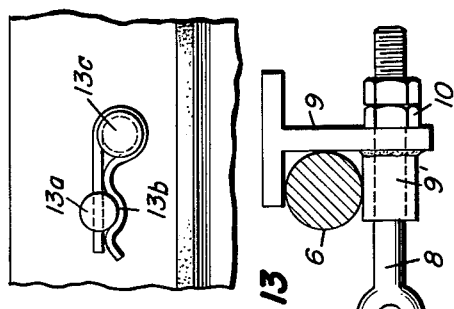
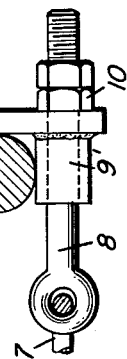
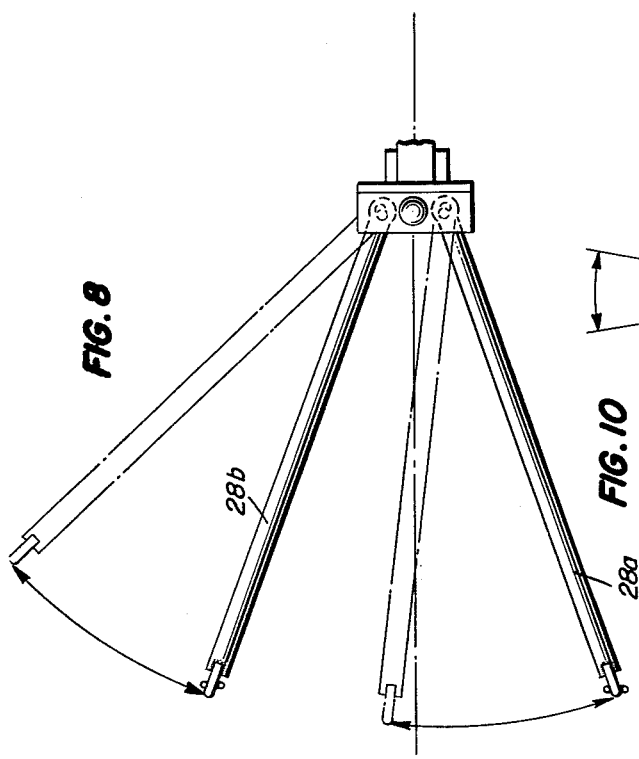
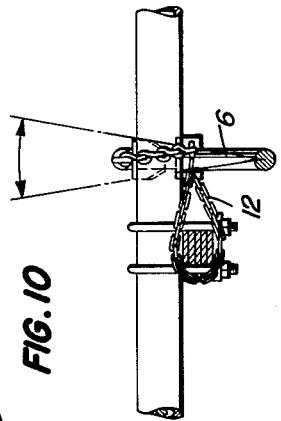
INVENTOR.
Martin H. Mathisen
BY
ATTORNEY United States Patent Office 3,220,749
Patented Nov. 30, 1965

3,220,749
TRAILER HITCH
Martin H. Mathisen, 10618 Keswick St., Sun Valley, Calif.
Filed Nov. 30, 1962, Ser. No. 241,308
11 Claims. (Cl. 280—406)

This invention relates to a trailer hitch for connecting a towing vehicle with a trailer and is of such construction as to prevent weave and side sway both in a straightaway direction or on curves.

In the prior art devices over which this invention is an improvement, the drawbar of the hitch comprises a pair of arms each secured at either side of the differential to the rear axle housing. The arms of the drawbar then converge rearwardly to a location centrally of and beyond the rear of the vehicle and are provided with a hitch ball bracket or head secured to their converging ends. The bracket supports an upstanding ball-shaped member which is received in a socket secured to the forward end of the trailer tongue.

The prior art devices also provide a pair of spring bars which are pivotally mounted on a vertical axis in the ball hitch bracket at respectively opposite sides of the ball and with respect to the center line of the vehicle. These spring bars are normally extended below the respective sides of the tongue or drawbar of the trailer which is in the form of a forwardly extending V or triangle, the base of which is connected to the trailer with the apex carrying a socket member for receiving the ball on the bracket. The above mentioned spring bars are then drawn upwardly at their opposite or rear ends by means of flexible chains extending from the spring bars to the trailer tongue under tension. This has the effect of raising the ball and socket joint to a position where the trailer tongue will be substantially horizontal and the load will be semi-equalized. When this novel head 14 is inserted in the socket of a frame type installation then it becomes a frame style load equalizing hitch as shown and described in Patent No. 2,597,657 issued May 20, 1952, issued to M. H. Mathisen and in Patent No. 2,817,541 issued December 24, 1957, issued to R. C. Mathisen.

This invention contemplates improvements in several features of the structure of the above described prior art devices, as will be hereinafter described. As one improvement, the forward ends of the drawbars are provided with adjustable extensions which are constructed in the form of open hook-like members engageable over the rear axle housing of the towing vehicle and are generally attachable thereto by flexible members. A protective member in the form of a shield is provided between each drawbar extension and the axle to reduce wear on the latter. The drawbar extensions are longitudinally adjustable with respect to the main drawbars and are also tiltable sideways. A socket member is welded to the rearward ends of the drawbars for the reception of a square shank which is held therein by a removable pin. As hereinafter described, the ball hitch bracket is so constructed that the shank may be weldable thereto in selected positions.

An important improvement contemplated by this invention lies in the manner of pivotally mounting the above referred to spring bars to the ball hitch bracket or head in order to prevent sway and weaving of the towing vehicle and trailer, both on the straightaway or on curves.

This is achieved by the off-vertical positioning of the sockets carried by the head while the hinge pins carried by the spring bars and which are received in the sockets, are mounted at right angles to such bars. A novel form of a quick hook-up device is provided on the tongue of the trailer for drawing up the spring bars to place them under tension. The invention further provides a novel stop bracket adjustably mounted on the socket member welded to the rear ends of the drawbars and which bears underneath either the rear bumper or rear frame portion of the towing vehicle to serve as a stop for upward thrust caused by the spring bars when encountering dips or going over uneven terrain. The last mentioned socket member also carries an arm extending laterally from each side thereof and is provided with a hook for engaging over the bumper for supporting the rear end of the drawbar when a trailer is not being towed. The above improvements and other novel features of this invention are fully described hereinafter.

It is therefore one object of this invention to provide an extensible drawbar which is readily secured to the rear axle of a towing vehicle.

Another object of this invention lies in the provision of a novel ball hitch bracket or head for pivotally supporting a pair of spring bars at their forward ends in such a way that weave and sway of the trailer and towing vehicle are avoided when the spring bars are attached at their rear ends by chain to the trailer tongue.

A further object of the invention is the improvement in a structure readily attachable to the tongue of a trailer for quickly and easily attaching the chain ends of spring bars thereto under tension.

A still further object of the invention is the provision of a structure for readily attaching a ball hitch bracket or head to the drawbar of a towing vehicle.

Further objects and advantages of the invention will become apparent from the following description and claims and from the accompanying drawings in which:

FIG. 1 is a side elevational view of the rear portion of an automobile or towing vehicle frame having secured thereto the improved trailer hitch structure in accordance with the invention.

FIG. 2 is a cross-sectional plan view of the structure shown in FIG. 1 and taken along line 2—2 thereof.

FIG. 3 shows a C-clamp attached to one of the members forming the trailer tongue and carrying chain adjusting means for placing the spring bars under tension.

FIG. 4 is a rear view of the ball hitch bracket without the ball showing the upper and lower sockets with the spring bars pivoted thereto.

FIGS. 5 and 6 are cross-sectional views taken on lines 5—5 and 6—6 of FIG. 4.

FIG. 6A is a cross-section on lines 6A—6A of FIG. 4.

FIG. 7 is a cross-sectional view on line 7—7 of FIG. 2 showing the main drawbar and its extension clamped thereto.

FIG. 8 is a plan view of the spring bars shown in full lines when the towing vehicle is moving straightaway and in broken lines when the vehicle is moving about a curve.

FIG. 9 is a front view of the socket secured to the rear end of the drawbar showing the lateral arm extensions carried thereby and which are attached to the rear bumper of the towing vehicle for supporting the drawbar when not in use.

FIG. 10 is a view showing a drawbar extension attached, by chain, to an adjacent spring of the towing vehicle.

FIG. 11 is an enlarged showing of a locking spring for the removable pin which retains the shank within the socket secured to the rear end of the drawbar.

FIG. 12 is a cross-sectional view along line 12—12 of FIG. 2.

FIG. 13 is a detail view of an eyebolt for attaching a chain secured to the hooked end of the drawbar extension to an upright portion of the extension by means of a T-clamp.

FIG. 14 shows the adjustable positions which the shank is capable of assuming relative to the forward end of the ball hitch bracket before being welded thereto.

The drawbar of the hitch to be attached to the rear axle housing 1 of the automobile or towing vehicle is comprised of a pair of main drawbar sections 3 made of solid bars of spring steel so as to possess maximum strength with the least cross-sectional dimension in order to obtain maximum road clearance. The sections each have a portion near one of its ends bent at a suitable angle such that when the bent end portions are parallel the remaining portions of the sections diverge from each other. The parallel ends of the sections are welded to the lower wall of a sleeve or socket member 13 having a rectangular opening extending in a direction parallel to the common plane of the main drawbar sections. Each of the sections 3 is provided with a pair of spaced clamping members 4 each being in the form of a pair of parallel arms 2 welded or otherwise secure at each of their ends to the section. The arms 2 of each pair are complementarily shaped to receive a drawbar extension 5 made of round spring steel, the outer ends of the arms 2 being provided with registering openings to receive a bolt 3 for drawing the arms together by means of a nut threaded thereon.

The forward end portions of the extensions 5 are bent upwardly and each of their ends reversely bent to form a hook-like portion 6 which, when the drawbar extensions are properly longitudinally adjusted, can rest on the upper portion of the rear axle housing and abut its forward portion, as shown in FIG. 1. The drawbar including the main sections and its extensions are so located with respect to the longitudinal center of the towing vehicle that the hook-shaped portions 6 are equally spaced from either side of the differential housing. In order to secure the drawbar to the axle housing, a flexible chain is secured at one end to the extreme end of the hook-shaped member 6 and carries at its other end a threaded eyebolt 8 which passes through a sleeve 9' extending laterally from the vertical leg of a reversible T-shaped clamping member 9. When the eyebolt is drawn up by rotation of the nut 10 the vertical leg of the T-shaped clamping member will abut the vertical portion of the drawbar extension 5 which will be received in the space between the sleeve 9' and a horizontal portion of the T-shaped clamp. Further rotation of the nut 10 will draw the chain 7 tightly about the axle housing to secure the drawbar thereto. During the installations of the drawbar, the extensions may be tilted in either direction by loosening the clamps 4 in order to bypass any obstructions on or near the axle. A metal shield 11 of proper size and dimensions may be interposed between the hook-shaped portion 6 of the drawbar extension and the axle housing to protect the latter from wear. After tightly securing the drawbar to the axle housing, any tendency to sidewise movement of the hitch on the axle can be prevented by a flexible chain 12 secured at one end to the drawbar extension, passing around an adjacent supporting spring or frame portion of the vehicle and provided at its other end with a hook for engaging a link of the chain.

The hitch ball bracket or head 14 is preferably an integral member of weldable carbon steel or other such suitable material and includes a horizontal plate member 14A and a vertical plate member 14B depending from one end of the horizontal plate member at substantially right angles thereto. Extending from the outer surface of the vertical plate member is a pair of spaced walls 18 weldably secured edgewise thereto to receive a shank member 15 which is of such shape as to be received snugly within the sleeve or socket member 13 and between the walls 18. Before welding the shank member 15 to the walls, it is adjusted vertically relative to the head and may also be inclined relative thereto as shown in FIG. 14, before being welded to the walls 18. The shank 15 is provided with a laterally transverse opening therethrough intermediate its ends which registers with a pair of alined openings in sleeve 13 when inserted therein. A pin 13a passes through the alined openings in the shank and sleeve and is prevented from slipping out by a safety spring lock 13b having a portion extending through an opening in the emergent end of the pin and engaging in a groove of a stud 13c secured to and extending from the wall of the sleeve.

Secured to the end of member 13 opposite to that which receives the shank, is a vertical sleeve 21. A bracket in the form of a flat plate 19 covered with resilient material 19a such as rubber, is provided with a shaft 20 extending into the sleeve opening. The bracket can therefore be adjusted vertically and angularly about the axis of the shaft for engagement with the rear bumper or rear transverse frame portion of the towing vehicle. The bracket can be secured in adjusted positions by means of a set screw 22 and a lock nut 23. As will be hereinafter pointed out, the bracket 19 serves as a stop for the upward thrust caused by the spring bars connected to the trailer tongue when encountering dips or uneven terrain. Secured to the rear end of each main drawbar section 3 below the sleeve 13 is an arm 24 extending laterally outward in an upwardly inclined direction. Each of the arms 24 is provided with an opening adjacent its free end for the reception of a removable eyebolt 24' which is spring loaded to normally move downwardly. The eyebolt is linked to a chain 26 carrying a bumper hook 27 which can be hooked over the rear bumper of the towing vehicle to support the rear end of the drawbar when it is not being used for towing a trailer. The spacing of the support chains is such that the license plate of the vehicle is not obscured and also prevents any tendency of the drawbar to twist when not in use.

The earlier mentioned stabilizing spring bars 28a and 28a are of one-piece construction with upper and lower integrally formed axially-alined hinge pins 29 formed at a true right angle to the center line of each bar at one end thereof and of equal diameter. The bars are enlarged at the intersections with the hinge pins where the greatest strain occurs and from this point are gradually tapered to the opposite end so as to distribute flexibility and supporting strength evenly throughout their entire length. The upper and lower hinge pins 29 are received in upper and lower socket members secured to the head 14. The upper socket members 16 are welded to the lower surface of the horizontal plate member 14A of the head 14 and are provided with pin entrance slots 16' extending outwardly from the central axis of each socket opening at an angle of approximately 45° to a center line passing through the head and towing vehicle, the center line being equally spaced from the central axis of the pin-receiving openings of the socket members. These central axes are equally spaced from the surface of plate 14B.

The lower socket members 17 for receiving the lower pin portions 29 are in the form of substantially horizontal U-shaped members with the ends of their arms welded to the vertical plate 14B of the head 14. The bight of each U-shaped member is semicircular and has a diameter substantially equal to that of the lower pin received by it. The axes of the bights are equally spaced from opposite sides of the center line of the head but are somewhat more distantly spaced from each other than the axes of the upper socket members 16. Additionally, the axes of the bights of the lower socket members 17 are equally spaced from the inner surface of the vertical plate 14B but are closer to the plate than the axes of the upper socket members 16. The parallel legs of the respective socket members 17 are inclined toward each other in the direction of forward movement of the vehicle at an angle of approximately 4°. The hinge pin openings in the socket members 16 and 17 are so arranged that the axes of the hinge pins 29 of the respective spring bars are at an angle to one another when located in their corresponding sockets as when the face end portions of the bars are attached to the trailer tongue and the trailer is being towed in a straightaway direction. The difference in spacing of the axes of the lower socket members 17 with respect to the center line of the head and the plate 14B as compared to the corresponding spacing of the upper sockets, is such that the axis of each pair of pins when mounted in the sockets is inclined in an upward direction both rearwardly and inwardly at an angle to the vertical of approximately 5½ degrees in a direction transverse to the center line of the head and substantially 3 degrees in a direction parallel to the center line.

Attached to each side bar 30 of the triangular-shaped tongue of the trailer is a clamp 31 having a horizontal jaw and a vertical jaw conforming to the cross-sectional shape of the side bar 30. A vertically inward extension of the horizontal jaw of the clamp carries a threaded bolt for locking the clamp to the bar 30. The outer periphery of the clamp generally follows the contour of the jaws, the sides thereof being outwardly extended to form a pair of spaced parallel flanges 32. Pivoted at 33 between the flanges, at about the line of the horizontal jaw of the clamp, is a shaped hollow arm 34 having a tubular sleeve 35 welded to and protruding from the end of the arm remote from its pivoted end for the reception of a tire wrench handle or other suitable bar. A hook 36 is welded to the arm 34 adjacent to its sleeved end for the reception of the link of a chain 37, the end of the chain being suitably fastened to the end of the spring bar. To attach the spring bars 28 under tension to its corresponding side bars of the tongue T of the trailer, the hollow arm 34 is swung downwardly to a position wherein a selected link of the chain 37 can be placed over the hook 36. A bar is then inserted in the sleeve 35 and the arm 34 raised until it passes over its pivot center and rests on the horizontal portion of the clamp on the side bar of the trailer tongue. The tension of the spring bar will maintain the arm 34 locked in this position. To prevent accidental unlocking of the arm 34, a spring stirrup 38 is pivoted on the horizontal portion of the clamp and passes over the sleeve 35 when the arm is resting on the clamp. The tension of the spring bars 28a and 28b is thus capable of quick and easy adjustments by selecting an appropriate link of the chain 37 to be engaged by the hook 36.

The spring bars 28a and 28b can be easily connected to the head 14 by inserting the lower pins 29 into the lower sockets and the upper pins into the upper sockets through the angled slots 16'. The 45-degree angle of the slots with respect to the center line of the head is such that dropping out of the pins 29 from the upper sockets is avoided even when the towing vehicle is turning or backing at an angle. The spring bars 28a and 28b are interchangeable and they can be reversed should they become bent from misuse or accident or should one of the pair of hinge pins wear more than the other, thus obtaining longer usage from the hinge pins.

The hitch is designed and constructed so as to prevent weave and side sway to the greatest possible degree. When the towing vehicle is in a straightaway driving position, both spring bars 28a and 28b exert a counteracting force against each other to keep the towing vehicle and trailer in a straight line. This force is caused by the off-vertical positioning of the hinge pins and sockets and the effect the trailer tongue weight has thereon. At the slightest turn of the towing vehicle from a straightway direction, such as to the left, the spring bar 28a will move from the full-line position shown in FIG. 8 to the position shown in dotted lines toward the center of the head. This spring bar picks up more of the trailer tongue weight due to the angular positioning of the hinge pin sockets in the head 14 of the hitch, which allows the free ends of the respective bars to lower 1½ to 2" when the bar is moved toward the center line of the head and rise 1½ to 2" when bar is moved away from the center. This in turn reduces the effective weight of the trailer tongue on the bar 28b shown in the figures and which has swung to the dotted-line position. At the same time, tension is also relieved on the bar 28b by the off-vertical angle of the hinge pin sockets. Thus all tendency of the said bar 28b to cause twisting or leaning of the car is eliminated while negotiating a turn or a curve. The positions of the hinge pin sockets are so calculated that forces necessary to swing the main load carrying spring bar 28a toward the center line of the towing vehicle exert a resistance to sway of the towing vehicle caused by uneven roads or the passing of large vehicles such as moving vans, etc. The reverse is true when the towing vehicle turns in the opposite direction.

Having thus described and illustrated a preferred embodiment of my invention, obvious changes may occur to one skilled in the art without departing from the scope and spirit thereof as defined by the appended claims.

I claim:

1. In a hitch for a trailer having a V-shaped tow-bar with the apex forwardly thereof, a hitch ball bracket adapted to be secured to the towing vehicle, a pair of elongated spring bars each having a pair of axially aligned pins at its forward end projecting from respective opposite sides thereof and normal to the length of the spring bar, said bracket having a pair of upper and lower sockets at each side of the hitch ball for receiving the respective pins therein, each upper socket being offset rearwardly with respect to its corresponding lower socket, and means for flexibly attaching the rear ends of the spring bars to respective adjacent sides of the tow-bar.

2. In a hitch for a trailer as defined by claim 1 in which the upper socket of each pair is rearwardly offset relative to its corresponding lower socket such that the axes of the pins when mounted in the sockets are at an angle of substantially 5½° with respect to the vertical.

3. In a hitch for a trailer having a V-shaped tow-bar with the apex forwardly thereof, a hitch ball bracket adapted to be secured to the towing vehicle, a pair of elongated spring bars each having a pair of axially aligned pins at its forward end projecting from respective opposite sides thereof and normal to the length of the spring bar, said bracket having a pair of upper and lower sockets at each side of the hitch ball for receiving the respective pins therein, each upper socket being offset laterally outwardly with respect to its corresponding lower socket and means for flexibly attaching the rear ends of the spring bars to respective adjacent sides of the tow-bar.

4. In a hitch for a trailer as defined by claim 3 in which the upper socket of each pair is laterally inwardly offset relative to its corresponding lower socket such that the axes of the pins when mounted in the sockets are respectively at an angle of substantially 3° relative to a vertical plane extending in the direction of forward movement of the towing vehicle.

5. In a hitch for a trailer as defined by claim 3 in which the upper socket of each pair is further offset rearwardly with respect to its corresponding lower socket.

6. In a hitch for a trailer as defined by claim 5 in which the upper socket is rearwardly offset with respect to its corresponding lower socket such that the axes of the pins when mounted in the sockets are at an angle of substantially 5½° to the vertical.

7. In a hitch for a trailer having a V-shaped tow-bar with the apex forwardly thereof, a hitch ball bracket adapted to be secured to the towing vehicle, a pair of elongated spring bars each having a pair of oppositely extending axially aligned pins at its forward end projecting from respective opposite sides thereof and normal to the length of the spring bar, said bracket having a pair of upper and lower sockets at each side of the hitch ball for receiving the respective pins therein, each upper socket being offset both in a rearward and laterally outward direction with respect to its corresponding lower socket and having an entrance slot for the hinge pin, said slot extending through the wall of the upper socket from the central axis thereof both rearwardly and laterally outward at an angle of approximately 45° with respect to a line passing through the hitch ball and center line of the vehicle.

8. A trailer hitch for attachment to a towing vehicle comprising a V-shaped draw bar, the free forward end of each arm of the bar terminating in a hook-shaped member for engaging the forward and upper surface of the towing vehicle axle housing, a flexible member extending substantially about the remaining surface of the housing and connected at its ends to the hook-shaped portion of the bar, the lengths of the arms of the bar being such that the apex of the bar is located substantially beneath a rear frame portion of the towing vehicle, a ball hitch bracket extending rearwardly from the apex of the draw bar and a stop member projecting upwardly from the apex normal to the bar and capable of abutment with the rear frame portion of the towing vehicle, the arms of the draw bar each including a pair of longitudinally adjustable elongated bars and clamping means for locking the elongated bars in fixed relation to each other.

9. A trailer hitch comprising a V-shaped draw bar and a V-shaped tow bar, means securing the legs of the draw bar to a towing vehicle axle housing, means securing the legs of the tow bar to the trailer, and means pivotally securing the apex of the tow bar to the apex of the draw bar, the means for securing the legs of the draw bar to the towing vehicle axle housing comprises an upwardly and rearwardly extending hook formation on the end of the legs of the V, and a flexible member secured to the end of the hook formation and to the upwardly extending portion thereof, each leg of the V of the draw bar comprising separate elements adjustably clamped together and sway preventing means comprising a bar secured to each leg of the tow bar and pivotally connected to the apex of the tow bar, the pivotal connection comprising a pair of upper and lower sockets and pins secured to each bar and received in said sockets.

10. A device as in claim 9 wherein the axes of the pins are at an angle of substantially 5½° with respect to the vertical.

11. A trailer hitch comprising a V-shaped draw bar and a V-shaped tow bar, means on the legs of the draw bar for securing the legs of the draw bar to a towing vehicle axle housing, means on the legs of the tow bar for securing the legs of said tow bar to the trailer, and means pivotally securing the apex of the tow bar to the apex of the draw bar, the means for securing the legs of the draw bar to the towing vehicle axle housing comprising an upwardly and rearwardly extending hook formation on the end of the legs of the V for engagement with the forward and top surfaces of the housing, and a flexible member secured to the end of the hook formation and to the upwardly extending portion thereof and adapted to engage the rear and lower surfaces of said axle housing, each leg of the V of the draw bar comprising separate elements clamped together, said clamping means comprising spaced clamp elements fixed on one of said separate elements and slidably receiving the other of said separate elements, and means for securing the clamp elements in frictional engagement with said other of said separate elements.

References Cited by the Examiner
UNITED STATES PATENTS

| 1,286,367 | 12/1918 | Loyer | 280—503 |
| 1,435,063 | 11/1922 | Holmes | 280—482 |
| 1,492,491 | 4/1924 | Swope | 280—503 |
| 1,541,037 | 6/1925 | Fleming | 280—503 |
| 1,572,914 | 2/1926 | Fleming | 280—503 |
| 1,612,191 | 12/1926 | Hubbard | 280—503 |
| 2,449,315 | 9/1948 | Partin | 280—503 |
| 2,485,743 | 10/1949 | Koback | 280—501 |
| 2,646,289 | 7/1953 | Smith | 280—501 |
| 2,772,893 | 12/1956 | Wettstein. | |
| 2,808,272 | 10/1957 | Resse | 280—406 |
| 2,817,541 | 12/1957 | Mathisen | 280—406 |
| 2,828,144 | 3/1958 | Hosmer | 280—503 |
| 2,952,475 | 9/1960 | Reese | 280—406 |
| 2,954,241 | 9/1960 | Warren | 280—503 |

FOREIGN PATENTS 436,748 11/1926 Germany.

A. HARRY LEVY, *Primary Examiner.*

PHILIP ARNOLD, *Examiner.*